United States Patent [19]

Marocco

[11] 4,013,809

[45] Mar. 22, 1977

[54] METHOD OF SEALING A POROUS BLOCK

[75] Inventor: Giuseppe Marocco, Turin, Italy

[73] Assignee: Soberman Establishment, Liechtenstein, Liechtenstein

[22] Filed: Dec. 23, 1975

[21] Appl. No.: 643,738

[30] Foreign Application Priority Data

Dec. 31, 1974 Italy .................... 70807/74

[52] U.S. Cl. .................. 427/296; 118/50; 264/102; 427/430 R

[51] Int. Cl.² .................... B05D 3/00

[58] Field of Search .......... 427/294–298, 427/430, 435, 439–443; 118/50, 50.1; 156/382, 184; 264/88, 90, 91, 101, 102, 313–315

[56] References Cited

UNITED STATES PATENTS

| 1,594,124 | 7/1926 | Shrader | 156/285 X |
|---|---|---|---|
| 2,276,004 | 3/1942 | Vidal et al. | 156/382 X |
| 2,878,140 | 3/1959 | Barr | 427/295 |
| 2,946,700 | 7/1960 | Day | 427/294 X |
| 3,532,575 | 10/1970 | Nagata et al. | 156/286 |

Primary Examiner—Morris Kaplan
Attorney, Agent, or Firm—Sughrue, Rothwell, Mion, Zinn & Macpeak

[57] ABSTRACT

A block to be consolidated, which is contained in a bag made of liquid tight flexible sheet material, is enclosed in a pressure tight container with the open mouth of the bag open upwardly. While the vacuum is maintained in the container, a liquid medium is supplied into the container and around the bag until the liquid medium reaches a level lower than the level of the open mouth of the bag, after which the container is evacuated into a vacuum state, and then a fluid hardenable resin composition is fed into the bag, through its open mouth, until the block is immersed in said composition. Thereafter, the vacuum is released from the container, so that the fluid resin composition deeply penetrates into all the cavities of the block which are open to the outside, and finally the resin composition is allowed to harden, whereby a consolidated block is obtained.

4 Claims, 1 Drawing Figure

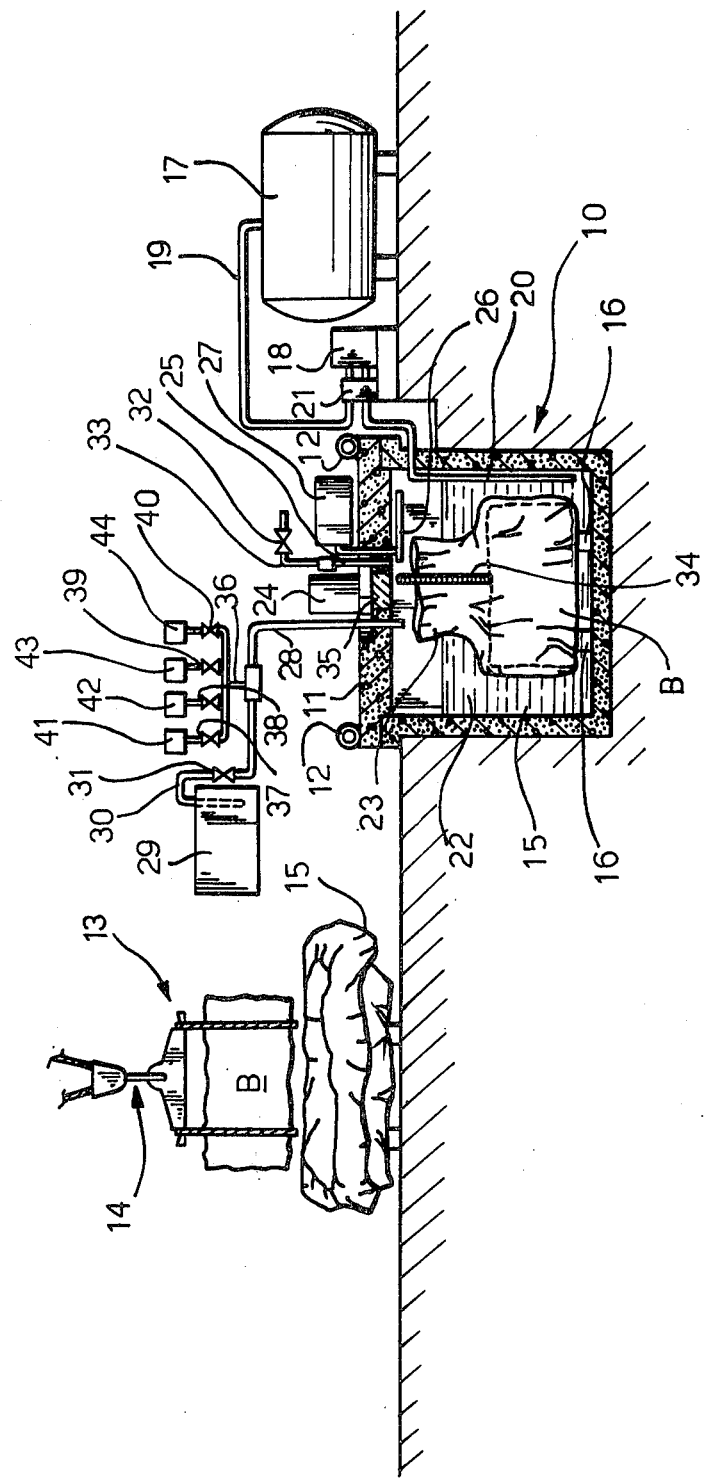

METHOD OF SEALING A POROUS BLOCK

The present invention relates to a method for consolidating elements of natural stone which have cavities open to the outside, of the type in which the element to be consolidated is placed in a pressure-tight container, then the container is evacuated and, after a certain time and while the vacuum is maintained, the element to be consolidated, contained in the container, is immersed in a fluid hardenable resin composition, after which the vacuum is released and the element to be consolidated is subjected to atmospheric pressure or to an overpressure to cause deep penetration of the resinous composition into the cavities of the block, and finally the resinous composition is allowed to harden in the cavities and around the element immersed in the composition itself.

Methods of this nature for the consolidation of construction elements, such as stones and bricks, are already known, in which the application of the vacuum before the hardening of the resinous composition serves to remove the humidity from the elements and further the evacuation provides the degasification of the fluid resinous composition. In this way, well consolidated elements can be obtained due to the elimination of the gaseous occlusions which otherwise would remain in the pores and in the cavities with the resinous composition.

Nevertheless, if in these methods the container for the element to be consolidated is a container of rigid fixed walls containing a bath of fluid resinous composition in which the element to be consolidated is to be immersed in the hardening step of the composition, there arises the inconvenience that the hardening of all the resinous composition of the bath takes place, with a considerable waste of this composition for each element consolidated. To eliminate this disadvantage a container having a form corresponding to that of the element to be consolidated and of slightly larger dimensions than that of the element itself can be used, but this is not convenient for the consolidation of large blocks of natural stone, such as blocks of marble, which are extracted from quarries, because these blocks almost always have irregular and inconstant dimensions, and thus would require the construction, for each block, of a container of the corresponding form.

In German Patent Application DT-OS 2,254,146 there is described a method for consolidating and protecting porous elements from the weather, particularly construction stones, in which the porous element is first subjected to an evacuation and then immersed in a bath of impregnation fluid resin, of the heat-hardenable type. The penetration of the resin in the pores is then obtained by means of a pressure or overpressure which is applied to the element during its removal from the bath and which is allowed to act on the element itself for a certain time while the element is outside the bath and while it is subjected to heating to cause the hardening of the resin in the pores.

This method permits the realization of a considerable saving in resin, because the only resin used is that which remains in the pores, while the resin in the bath remains in the fluid state and can be re-used for the impregnation of other elements. Nevertheless, neither is this a method suitable for the consolidation, by means of impregnation, of large blocks of marble or other natural stones, which are extracted from quarries, because these blocks do not have only small porosity, but large cavities of all types, in the forms of cracks, fractures, alveoli, etc., from which the fluid resinous composition is discharged through gravity, following extraction of the block from the bath prior to hardening of the composition itself. In the case of cavities in the form of through channels, the discharge of the resinous composition could be total.

In USA patent No. 3,532,575, there is described a process for the manufacture of laminate materials, particularly insulating materials for electric condensers, by means of impregnation of a roll of material in sheet form with a synthetic resin. The impregnation of the roll takes place in an envelope of thermoplastic sheet material which is hermetically sealed and is connected, by means of a pair of tubes, respectively to a vacuum pump and to a reservoir of impregnation fluid resin. The envelope is maintained completely immersed in a liquid contained in a hermetically sealed container. After the impregnation resin has been sucked into the envelope and around the roll due to the evacuation by the vacuum pump and after, for the purposes of degasification, the resin has been left under vacuum for a certain time in the envelope, a pressure which causes deep penetration of the resin in the roll contained in the envelope is externally applied to the liquid. Because the envelope of thermoplastic material, although it is liquid tight, does not have good gas-tight characteristics, the liquid will be separately degasified prior to its introduction into the hermetically sealed container.

A method of this type can be applied to the impregnation, with the aim of consolidation, of small elements of natural stone also of irregular form, because the residual quantity of the resinous composition on the external surface of the impregnated element would be very limited, due to the fact that the envelope is "squeezed" against the element itself, but would not be convenient for the impregnation of large blocks of natural stone, such as marble, which are extracted from quarries, because apart from the difficulty of producing a sealed envelope of sheet material around a large block of irregular form, the large volume of the container adapted to contain the blocks in its envelope requires the use of a very large quantity of liquid for the application of the pressure and all this liquid would be preliminarily and separately degasified with a notable complication of the apparatus.

In the prior art there does not exist, therefore, a method adapted to the consolidation of large blocks of marble and similar natural stones, such as are extracted from quarries, while a method of this type would be particularly useful for use without risk in the successive operations of slab cutting and ulterior working of the blocks which according to the normal criteria of evaluation would be considered for discarding due to the almost certainty of acquiring a quantity of non-remunerative slabs if not entirely a heap of fragments.

The problem behind the present invention is that of obtaining a method of the type mentioned in the preamble, which is adapted to the consolidation of blocks of marble or similar natural stones, also where these are extremely defective and of a very irregular form, and which does not present the disadvantages of the methods according to the prior art, and which permits the use for each block of the minimum quantity of resinous composition indispensable, and does not require a separate preliminary degasification of a liquid.

According to the present invention, this problem is resolved by means of a method characterised in that, to obtain the consolidation of large blocks of marble or other natural stone, the block, prior to being placed in the container, is introduced into a bag of liquid-tight flexible sheet material having an open mouth, the bag containing the block is introduced into the container with its open mouth above the block, the container is closed in a pressure-tight manner and its interior is evacuated, than, while the vacuum is being maintained, a liquid is introduced into the container, around the bag, up to a level lower than that of the open mouth of the bag, after which, while the vacuum is still maintained, the resinous composition is introduced into the container and directly into the interior of the bag through its open mouth to immerse the block, and finally, continuing to maintain the block in the bag surrounded by the liquid, the atmospheric pressure or an overpressure is applied to the interior of the container and the resinous composition is allowed to harden.

In a method according to the present invention, the degasification of the liquid takes place directly in the container because of the vacuum applied to the block. Further, the fluid resinous composition and the liquid, being in a common environment, are always subjected in common to the same pressure or evacuation and thus there is no difference in pressure which would aid a possible passage of gas from the liquid to the resinous composition through the wall of the bag.

Preferably, after the block has been immersed in the fluid resinous composition in the bag and during the penetration of the resinous composition into the cavities of the block, the level of the liquid around the bag is regulated so as to maintain the level of the resinous composition constantly above the block.

Thus, it is possible to regulate the level of the resinous composition so that also on the upper surface of the block there remains a layer of resinous composition of a thickness such as to guarantee the filling of the cavities which open onto the upper surface.

Preferably, the water vapour present in the container, including that originating from the block, is condensed as ice in the interior of the container itself.

This offers the advantage of a rapid elimination of the humidity from the interior of the container without requiring an exhaust pump of excessive power.

An apparatus for carrying out the method of the invention is characterised in that the container adapted to receive the block contained in the bag is provided, on the interior of one of its movable walls, with at least one refrigerated surface.

An apparatus of this type is advantageous in that it permits the removal of ice at the refrigerated surface or at each of these surfaces each time a block is extracted from the container, or to ensure that the ice melts and that the melting water drips outside the container itself, in which the presence of water is undesirable.

Advantageously, there is used a container in the form of a tank closable in a pressure-tight manner by means of an upper lid and in this case, the refrigerated surface or each of the refrigerated surfaces is supported from the internal face of the lid.

The invention will be more clearly described by the following, detailed description, with reference to the accompanying drawings, in which the single FIGURE is a partially sectioned schematic representation of an apparatus according to a preferred embodiment of the invention.

The apparatus illustrated in the FIGURE comprises, as a fundamental component, a tank 10, in the form of a buried pit, e.g., with walls of waterproof concrete. Nevertheless, a container of any other type can be used, so long as it is adapted to accomplish the above mentioned functions. The pit 10 is hermetically closable by means of a lid 11 containing lifting ears 12.

As illustrated in the left hand part of the FIGURE, a block of marble or similar natural stone, B, which comes, e.g. from a heating chamber (not illustrated) in which it has been submitted to core heating for drying, is lowered, by means of a harness 13 suspended from the hook 14 of a suitable hoisting apparatus, such as an overhead crane (non illustrated), into a bag 15 of flexible and liquid tight material, such as a bag of plastics film material.

After the block B has been introduced into the bag 15, the bag is transported into the pit 10. This transportation can take place, e.g., by means of the same overhead crane mentioned above, but this time passing the harness 13 over the exterior of the bag 15 and interposing protection elements between the bag and the harness 13 so as not to damage the bag. The block B contained in the bag 15 is lowered into the pit 10, with the lid removed, until it is deposited on supports 16 which are positioned at the bottom of the pit. Alternatively, distancing elements of this type could already have been provided at the bottom of the bag 15 prior to lowering of the block B. In either case this serves to leave a space between the lower face of the block and the internal surface of the bottom of the bag.

When the pit 10 has been closed in a pressure tight manner, its interior is evacuated by means of a vacuum pump 24 whose inlet communicates with the interior of the pit 10 by means of a tubing 25 which extends sealingly through the lid 11. The pump 24 can be installed on the lid 11.

The evacuation effected in the interior of the pit 10 has as its initial effect, due to the fact that it reduces the pressure of the water vapour, that of causing or enormously promoting, the evaporation of the water still contained in all the cavities of the block B (cracks, fractures, alveoli, etc.) which communicate with the exterior of the block itself. The evaporation of a first portion of the water contained in these cavities had already taken place following the heating having been effected on the block B. In this case, the block B is placed in the pit 10 and is subjected to evacuation while it is still at a temperature not much different from that at which the core heating took place.

The vacuation applied to block B and the heat which has possibly been imparted by the heating have thus the effect of rendering the block B perfectly dry at the moment of pouring the resin, which will be described later, because this serves to guarantee a perfect adhesion of the resin to the material of the block B and the consequent efficient adhesion of different parts of this material which can be separated by cracks, fractures and the like. Another advantage of the preliminary heating of the block B consists in the fact that, when the evacuation takes place, the block itself continuously provides the heat extracted by the evaporation and thus impedes formation of ice in its cavities.

Because the water vapour freed in the pit 10 is eliminated too slowly by the vacuum pump 24, according to the invention, in the interior of the pit 10 one or two refrigerated walls are preferably provided, such as schematically illustrated at 26. On the wall 26, which is connected to a refrigerating group, installed on the lid 11, as illustrated schematically at 27, the water vapour released from the block B condenses, preferably as ice, without having to be extracted from the pit 10. At the end of the process, after the removal of the lid 11, it will be easy to gain access to the refrigerated wall 26 to detach the ice layer.

It has been stated that it is possible to obtain a perfect drying of a block of marble by subjecting it for between one-half hour and 2 hours to an evacuation of circa 600 $mm_{Hg}$ (with respect to the atmosphere) at a temperature of circa 50° C or at an evacuation of circa 700 $mm_{Hg}$ (with respect to the atmosphere) at a temperature of circa 25° C. It will be noted that the heating temperatures of the block are not much elevated, but it is necessary to bear in mind that the apparatus herein described is destined to be used in the open air and thus in a non-heated environment, and that the blocks to be treated are normally provided from a deposit situated in the open air, and, prior to treatment, can also have temperatures lower than 0° C.

To avoid the use of a considerable power for the heating, a convenient solution consists in leaving the block B exposed to a battery or infrared heaters, in the said heating chamber, for a period of 8 hours, e.g. overnight. To obtain a more homogenous and quicker heating it would be possible to alternatively use a high frequency heating apparatus of elevated power.

When the block B has been dried and while the pit 10 is evacuated, a liquid, preferably oil, drawn from a reservoir 17 by means of a pump 18, via a tubing 19, at the side of the reservoir 17, and a tubing 20, at the side of the pit 10, is admitted into the pit 10. The pump 18 is connected to the tubings 19 and 20 by means of a suitable distribution valve, schematically illustrated at 21, which permits the reversing of the direction of flow of the liquid to return it from the pit 10 to the reservoir 17.

The liquid is admitted to the pit 10 to form a bath 22 for the purpose of impeding the deformation of the bag 15 when a resin in the fluid state is supplied to the bag, as will be later described. The level of the bath 22, naturally, must not be above the rim of the mouth 23 of the bag 15.

While the pit 10 is evacuated, one or more hardenable resins in the fluid state are then supplied into the bag 15, through its mouth 23. Through the lid 11 of the pit 10 there extends, sealingly, a flexible feeding tube 28, which opens above the mouth 23 of the bag 15. Considering the simplest case, in which a single resin is supplied, this resin being contained in the liquid state in a reservoir 29 at atmospheric pressure, an intake tubing 30 in the reservoir 29 is connected to the flexible feeding tube 28 via a suitable valve 31 or a similar cut-off means. While the pit 10 is evacuated, the tubing 30 is put into communication, e.g. by opening of the valve 31, with the feeding tube 28, whereby the vacuum in the pit 10 causes resin to be drawn from the reservoir 29. The resin thus descends over the block B and fills the space under the block B and over its lateral faces in the interior of the bag 15, and finally also covers the upper face of the block B, due to the fact that the mouth 23 of the bag 15 is above this face. At this point, the feeding is suspended, e.g. by closing the valve 31, and the block is completely surrounded by fluid resin.

The vacuum applied to the interior of the pit 10 acts both on the fluid resin and on the liquid of the bath 22 and provides the degasification of both.

The resin which surrounds the block B begins to penetrate into the cavities of the block which communicate with the exterior of the block itself (cracks, fractures, alveloi, etc.), but can very seldom fill these cavities, which can extend very deep into the block. To obtain complete filling of these cavities by the resin, the vacuum in the interior of the pit 10 is then released, allowing the pit to communicate with the atmosphere, e.g. by means of opening a valve 32 in a tubing 33 connected to the tubing 25. At this point, due to the difference between the atmospheric pressure which is exerted on the resin from the exterior and the evacuation which remains from the preceding step in the cavities of the block B, the resin deeply penetrates into these cavities and fills them completely. To this end, it is worth mentioning the fact that, to obtain the communication with the exterior also of any closed cavities existing in the core of the block, deeply penetrating holes can be bored in the block prior to treatment.

Throughout the above sequence the liquid of the bath 22 exterior to the bag 15 is permanently maintained at the same pressure as the resin in the interior of the bag itself, across which there does not exist a pressure difference such as to promote a possible passage of gas, not previously eliminated, from the liquid to the resin through the wall of the bag 15, which, although liquid-tight, is not guaranteed to be gas-tight.

According to an advantageous method, prior to supplying the resin, the pit 10 is filled with liquid up to a level substantially equal to or sightly above that of the upper face of the block B. The resin is supplied into the space between the bag 15 and the block B in a predetermined fixed quantity based on experience, so as to use the lowest quantity indispensable for the impregnation of the block to the highest degree possible and to further completely surround it. In general, the quantity of the resin employed will be such that its level, at the end of the resin feeding step, will be below the upper face of the block. In particular, since the resins employed generally have a specific weight greater than that of the oil or other liquid employed, the level of the resin will be below that of the bath 22. To ensure that the resin completely covers the block, to a height such that its upper face does not subsequently emerge following absorption of the resin in the cavities, more liquid is fed into the pit 10 so as to raise the level of the bath 22 and therefore also the level of the resin, due to the hydraulic head of the bath which, across the flexible wall of the bag 15, acts on the resin contained in the bag. The desired level of the resin above the block B can be controlled by means of a graduated rod 34, observable through a porthole 35 provided in the lid 11. In case, at the end of the feeding or during the penetration of the resin in the cavities, it is ascertained that the level of the resin above the block B is excessive, it is always possible to lower the level of the bath 22 by drawing a part of the liquid into the reservoir 17 by means of the pump 18, and correspondingly lowering the level of the resin.

As will be understood, the apparatus illustrated and described offers the great advantage of permitting the use of the method also on relatively amorphous blocks, beyond the fact that it permits the minimum consumption of the impregnation resin.

The impregnation resin can be colourless and transparent in the hardened state, so as not to contrast with the natural colouration of the block, but it is in some cases convenient to use a pre-coloured resin so as to present, in the hardened state, a colouration substantially equal to the natural colouration of the block. With materials particularly rich in cracks, natural fissures along the sedimentation lines and various cavities, such as e.g. in the case of certain types of onyx marble, the use of more diversely coloured resins can be convenient. These resins can be fed singularly, by means of separate feeding systems, or can be fed one after the other through a single tube such as that designated at 28. In this case, the conditions which the coloured resins must satisfy is that they are not intermixable, because in this case, they would form a single colour medium, and to this end resins of different densities can be used.

Nevertheless, we have been established that it is most advantageous to use a feeding system such as that illustrated in the FIGURE. In this feeding system, the reservoir 29 contains a base resin, colourless or of a neutral colour. To the feeding tube 28 there is connected a tubing 36 which, through valves 37, 38, 39, 40 or other cut-off means, is suitable to be put into communication from time to time with respective reservoirs 41, 42, 43, 44 which each contain a different dye. It is obvious that the number of these reservoirs with relative cut-off means can be varied.

To obtain different colourings of the resin, for the above mentioned purposes, it is sufficient to put into communication from time to time the reservoirs 41, 42, 43, 44, possibly under pressure, with the tubing 36 during the feeding of the base resin, so that the different dyes are injected into the base resin giving it the desired colourings. We have established that the differently coloured layers of the resin fed into the bag 15 do not in practice intermix, as a result of which even in this case the appropriate selection of colours and the definition of their positions after feeding can permit true and characteristic imitations of the colours, the shadings and the disposition of the veinings and other natural patterns of the material subjected to treatment.

In a feeding system, produced for experimental purposes according to this principle, a simple rubber tube was used as the feeding tube in which the dyes were injected from time to time, with optimum results, by means of normal syringes whose needle was injected into the tube wall.

Whatever feeding system is used, the appropriate selection of colours, the care in the selection of the resin or resins and the definition of the positions of the resin portions of different colours after the feeding can permit true and appropriate imitations of the colours, the shadings and the disposition of the veinings and other natural patterns of the material subjected to treatment.

In the method according to the invention thermosetting resins are advantageously employed with a catalyst and an accelerator such that their hardening takes place at ambient temperature. Optimum results have been obtained with polyester resins and with epoxy resins.

Before concluding the description of the process and of the apparatus illustrated in the FIGURE, it is further observed that, instead of suction, the feeding can take place through gravity and in this case the reservoir and the resin reservoirs can be situated internally of the pit 10. This could aid the degasification of the resin or resins prior to feeding. Also the water vapour emitted from the resins contained in the reservoirs would be condensed on the refrigerated wall 26, just as the condensation always, takes place advantageously, during and after feeding.

Although not illustrated, it is obvious that the feeding system of the resin or resins, whatever form it takes, is also provided with cleaning means in its tubing, valves, reservoirs, etc., e.g. by means of a suitable solvent.

To improve the penetration of the resins into the cavities of the block B the differentials between the residual pressure inside the cavities and the pressure exterior to the block can be increased.

To this end, after the evacuation has been released, it is sufficient to provide a super atmospheric pressure of air or another gas in the pit 10, prior to the hardening of the resin or resins. The only limit to this superatmospheric pressure is represented by the resistance of the pit 10 and its lid 11 to the pressure itself, but in practice good results have been obtained with a positive pressure of 0.5 at. This superatmospheric pressure could be introduced by connecting the tubing 33, in which the valve 32 is situated, to a compresser (not illustrated).

Finally, the resin is allowed to harden and produces, beyond the filling of superficial defects of the block, together with closure of the cracks, fissures and other discontinuities which are found in the body of the block itself and which communictae with its surface. The excess of resin remains on the external surface of the block B, furnishing it, and the slabs which will be cut from it, with a supplementary external reinforcing sheath.

After the hardening of the resin, the oil of the bath 22 is repumped into the reservoir 17, the lid 11 is removed and the consolidated block B is extracted from the pit 10 e.g. using the hoisting means 13, 14.

The removal of the lid 11 permits easy access to the refrigerated surface 26 for removal of the ice, alternatively to allow the ice to melt and the melting water to drip beyond the interior of the pit 10, where the presence of water is undesirable.

Alternatively, a removable container could be provided in the pit 10, adapted to contain oil and the block in its bag, and in this case this container with its entire contents could be removed after the penetration of the resin into the block, to allow the hardening of the resin in another location, always in the presence of oil exterior to the bag, and to permit the immediate re-use of the apparatus for the treatment of a further block.

After the block has been consolidated as above described, it cut into slabs according to the normal procedures. The slabs can be used as such, or can be cut into smaller elements, such as tiles.

We claim:

1. A method for consolidating a block of marble or other natural stone, having cavities open to the outside, comprising the following sequential steps:
    a. placing a block to be consolidated in a bag made of liquid-tight flexible sheet material, said bag having an open mouth;
    b. enclosing said bag and said block placed therein in a pressure-tight container, with said bag having its mouth above said block and open upwardly;
    c. evacuating said container into a vacuum state;
    d. while said vacuum is maintained in said container, supplying a liquid into said container and around said bag until said liquid reaches a level lower than the level of said open mouth;

e. while said vacuum is maintained in said container, supplying a fluid hardenable resin composition into said container in such a manner that said fluid composition is introduced into said bag through its open mouth, until said block is immersed in said fluid resin composition;

f. while said liquid is maintained around said bag, releasing said vacuum from said container, so that said resin composition deeply penetrates into said cavities in said block; and g. while said liquid is still around said bag, allowing said resin composition to harden in said cavities and around said block.

2. A method as claimed in claim 1, including the additional step of progressively regulating the level of said liquid around said bag from the time when said block is immersed in said fluid resin composition and during said deep penetration of said fluid resin composition into the cavities of said block in such manner that the level of said fluid resin composition is constantly maintained above said block.

3. A method as claimed in claim 1, including the additional step of condensing into ice, inside said container, any water vapor existing in said container, including that originating from said block.

4. A method as claimed in claim 1, including the additional step of placing said container into an overpressure state after said vacuum has been released.

* * * * *